F. GOSS.
Cultivator.
No. 98,251  Patented Dec. 28, 1869.
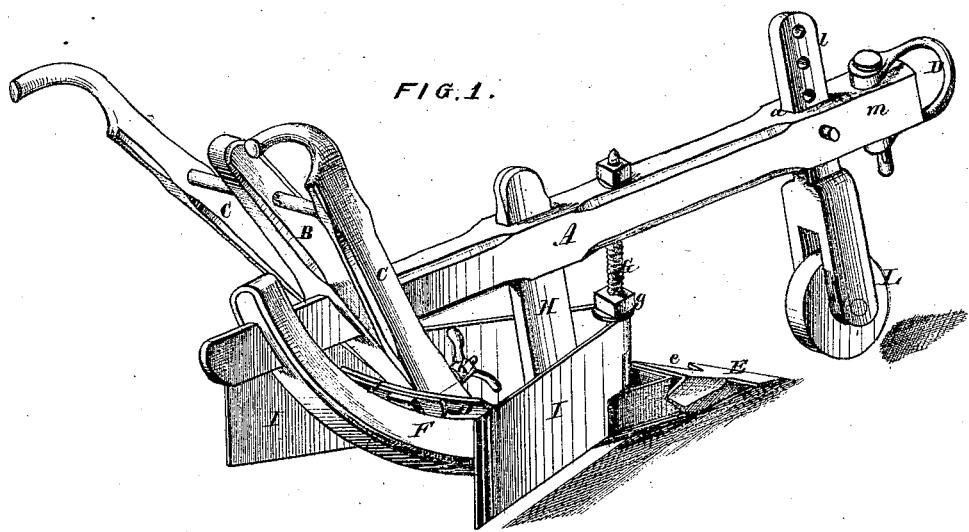
FIG. 1.
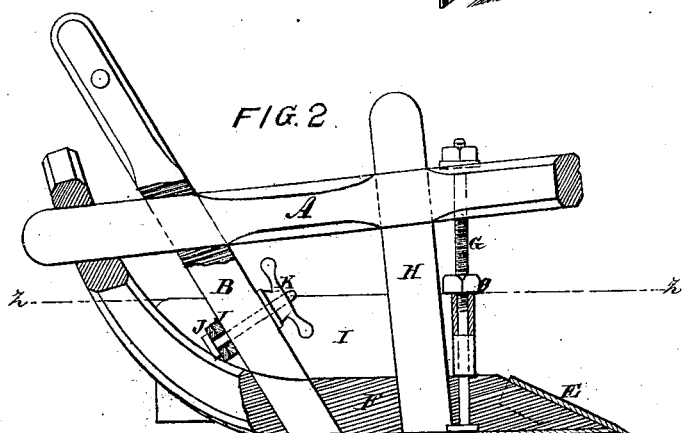
FIG. 2.
FIG. 4.
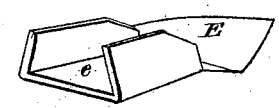
FIG. 3.
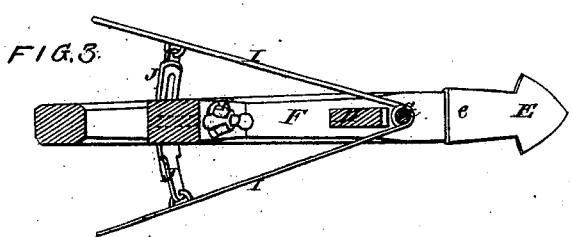

UNITED STATES PATENT OFFICE.

FRANK GOSS, OF WEXFORD, PENNSYLVANIA.

IMPROVEMENT IN SHOVEL-PLOWS.

Specification forming part of Letters Patent No. 98,251, dated December 28, 1869.

*To all whom it may concern:*

Be it known that I, FRANK GOSS, of Wexford, in the county of Allegheny and State of Pennsylvania, have invented an Improved Shovel-Plow; and I do hereby describe the same.

The subject of my invention is a shovel or cultivating plow of novel and improved construction. It is a beam implement, and adapted to work between rows and cultivate one side each of two rows at each cut, being provided with a central share or shovel by which to loosen the soil, and adjustable side wings or scrapers by which to force the loosened ground up to the plants.

The improvement consists in the combination of devices named; in a peculiar construction of frame, combining simplicity and strength in superior degree; and in a novel construction of the shovel or share, enabling its attachment without separate fastenings.

In the accompanying drawings, made a part of this specification, Figure 1 represents a perspective view of the plow in working position; Fig. 2, a side elevation, partly in longitudinal section, of a fragment; Fig. 3, a horizontal section on the line $z\,z$, Fig. 2; and Fig. 4, a perspective view of the shovel or share attached.

A straight or suitably-curved beam, A, affords the means for attachment of the other parts. It has jointed to it at its rear end the customary inclined standard, B, for the attachment of the handles C with which said standard is provided, as represented, and is provided at its front end with the usual clevis, D, or its equivalent, for the attachment of draft.

The shovel or share E is supported on the inclined front end of a sole-bar, F, supported in proper position under the beam. Said bar further provides a socket for the lower end of the standard B. Curving past the beam, it is traversed by the rear end thereof and its rear end thereby supported. Said curved portion of it, forming further the heel of the implement, is connected with the beam in front of the standard B by means of a tie-bolt, G, and an upright arm, H, secured thereon and traversing the beam. The shovel or share E is constructed or provided at its rear end with a flaring dovetail socket, $e$, Fig. 4, for the reception of its abutment or support, which latter being correspondingly shaped, the shovel being simply slipped on, will be securely held in place without other fastening.

The wings or scrapers I I are arranged on the respective sides of the sole-bar F, immediately behind the shovel or share E. They consist of straight flat plates of steel or other suitable material, and form as arranged vertical horizontally-inclined sides for forcing the earth laterally against the plants. They are hinged at their front ends, preferably as represented, to the tie-bolt G, supporting the front end of the sole-bar F, being in that case supported vertically by a nut, $g$, on said bolt, and are provided at their rear ends with suitable means for contracting and expanding them as required, which means may consist of slotted links J J, hinged thereto, and embracing a clamp-screw, K, traversing the standard B, as represented.

A vertical slot, $a$, in the front end of the beam A may receive the stem $l$ of the bracket or frame of a gage-wheel, L, said wheel being supported by a pin, $m$, traversing its stem within said slot, and adjustable vertically by a plurality of perforations for the reception of said pin, as represented, or by equivalent means.

A metallic sheathing, $n$, may protect the sole of the sole-bar F when said part is made of wood. Sufficient play being permitted by the joints between the sole-bar and beam at their rear ends and between the former and the standard, the tie-bolt G, supporting the front end of said bar, may serve to adjust its depth and angle.

The material of the several parts and the details of construction and arrangement are of course variable.

The frame being constructed as proposed, separate fastenings may be entirely dispensed with, thus lessening the original cost and labor of building the implement, and by facilitating taking it apart for transportation and storage thus further lessen its expense.

The simple form of the several parts adapts the implement to be made by any ordinary mechanic with common hand-tools. The superiority of its action in cultivating is apparent. It is of very light draft and adapted to be managed with the utmost facility.

I claim as my invention—

1. The combination, in a cultivating-plow, of a beam, A, standard B, sole-bar F, upright arm H, and tie-bolt G, constructed and arranged as herein described, and for the purposes set forth.

2. The sole-bar F, as constructed of the form represented and described.

3. The shovel or share E, constructed with the flaring dovetail attaching-socket $e$, substantially as represented and described.

4. The combination, in a cultivating-plow, of a frame, A B F G H, handles C, clevis D, shovel or share E, wings or scrapers I I, device J J K for adjusting the wings or scrapers, an adjustable gage-wheel, L $l$, and means, $a\ m$, for holding the gage-wheel, constructed and arranged as herein represented and described, for the purposes shown.

To the above specification of my improved shovel-plow or cultivator I have signed my hand this 9th day of November, 1869.

FRANK GOSS.

Witnesses:
F. M. KLAUCKE, Jr.,
T. SCHEITLIN.